US012782004B2

(12) United States Patent
Steeves

(10) Patent No.: US 12,782,004 B2
(45) Date of Patent: Nov. 3, 2026

(54) ARTICULATING SOLAR PANEL MOUNT

(71) Applicant: THE BILCO COMPANY, New Haven, CT (US)

(72) Inventor: Zachariah Steeves, New Haven, CT (US)

(73) Assignee: The Bilco Company, New Haven, CT (US)

( * ) Notice: Subject to any disclaimer, the term of this patent is extended or adjusted under 35 U.S.C. 154(b) by 113 days.

(21) Appl. No.: 18/642,046

(22) Filed: Apr. 22, 2024

(65) Prior Publication Data

US 2024/0353149 A1 Oct. 24, 2024

Related U.S. Application Data

(60) Provisional application No. 63/461,125, filed on Apr. 21, 2023.

(51) Int. Cl.
*F24S 25/70* (2018.01)
*F24S 25/61* (2018.01)
*H02S 20/23* (2014.01)

(52) U.S. Cl.
CPC ............... *F24S 25/70* (2018.05); *F24S 25/61* (2018.05); *H02S 20/23* (2014.12); *Y02E 10/47* (2013.01); *Y02E 10/50* (2013.01)

(58) Field of Classification Search
CPC ........... F24S 25/70; F24S 25/61; H02S 20/23; Y02E 10/47; Y02E 10/50
See application file for complete search history.

(56) References Cited

U.S. PATENT DOCUMENTS

| | | | | |
|---|---|---|---|---|
| 4,090,437 A * | 5/1978 | Bogaert | E05F 1/002 49/7 |
| 5,833,178 A * | 11/1998 | Plasse | A47B 97/08 248/447 |
| 5,927,012 A * | 7/1999 | Cermola | A62C 2/24 49/7 |
| 6,047,445 A | 4/2000 | Mennen | |
| 6,170,892 B1 | 1/2001 | Lantiegne | |

(Continued)

FOREIGN PATENT DOCUMENTS

| | | | |
|---|---|---|---|
| CN | 113071603 A * | 7/2021 | H02J 7/35 |
| DE | 202011050556 U1 | 10/2012 | |

OTHER PUBLICATIONS

Latest Ballasted Racking System for Solar, WHSSOLAR.

*Primary Examiner* — Omar F Hijaz
(74) *Attorney, Agent, or Firm* — DeLio Peterson & Curcio LLC; David R. Pegnataro

(57) ABSTRACT

An articulating solar panel mount comprising a slim profile lower frame that rests on and is affixable to a roof, and a spring-actuated upper frame that is hinged on one side. A solar panel may be attached to the topside of the hinged frame. The mount includes an indexable latching mechanism comprising a reversible quick release that can be adjusted to be accessed from either direction depending on installation needs. The latching release mechanism is designed to allow for "daisy chaining" multiple frames in succession, which allows for creation of a walkway/path through the solar array. The hinged solar frame may be over sprung to self-open, accounting for the weight of the solar panel and the frame itself.

18 Claims, 17 Drawing Sheets

(56) References Cited

U.S. PATENT DOCUMENTS

| | | | | |
|---|---|---|---|---|
| 6,799,395 | B1 * | 10/2004 | Dabrowski ......... | E02D 29/1418 49/386 |
| 8,166,706 | B2 * | 5/2012 | Slimak .................. | E05B 65/006 16/361 |
| 8,991,115 | B2 | 3/2015 | Hubbard et al. | |
| 9,303,441 | B2 * | 4/2016 | Bravo ................... | E05F 1/1058 |
| 9,473,066 | B2 | 10/2016 | Stephan et al. | |
| 10,079,570 | B2 | 9/2018 | Patton et al. | |
| 10,461,684 | B1 | 10/2019 | Rubin | |
| 10,581,371 | B2 | 3/2020 | Cinnamon et al. | |
| 10,601,363 | B1 * | 3/2020 | Rubin ..................... | H02S 20/23 |
| 11,349,431 | B1 | 5/2022 | Cerullo | |
| 2004/0221524 | A1 | 11/2004 | Poddany et al. | |
| 2007/0295393 | A1 | 12/2007 | Cinnamon | |
| 2008/0016780 | A1 * | 1/2008 | McDougle .......... | E05D 13/1253 49/387 |
| 2009/0114269 | A1 * | 5/2009 | Fletcher .................. | H02S 20/23 136/251 |
| 2010/0212659 | A1 | 8/2010 | Carpoff | |

* cited by examiner

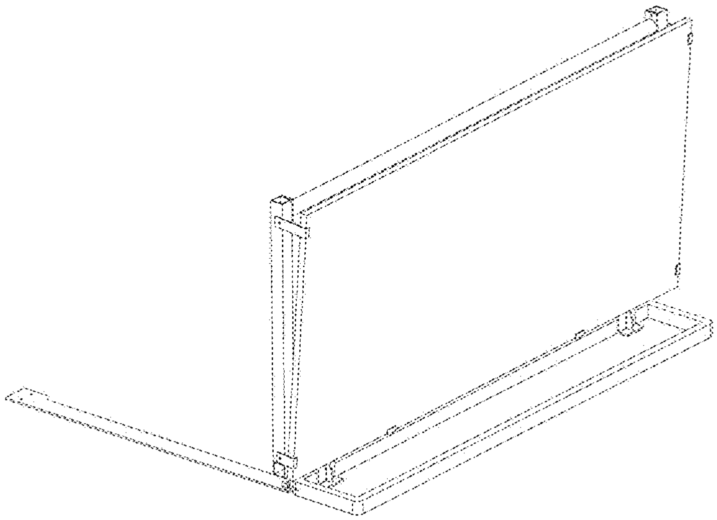
FIG. 15
FIG.15A
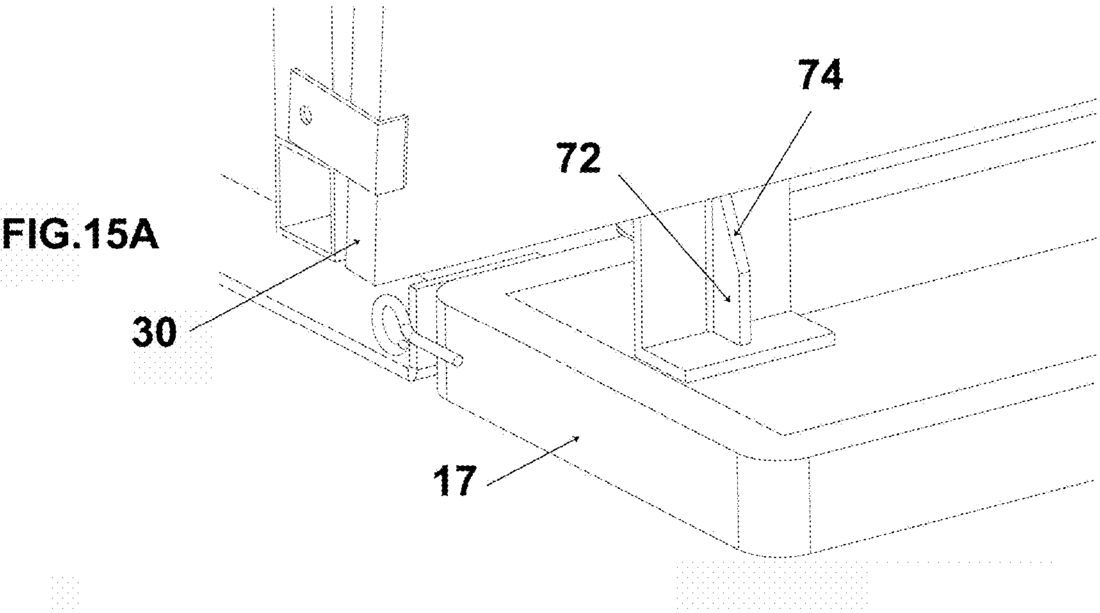
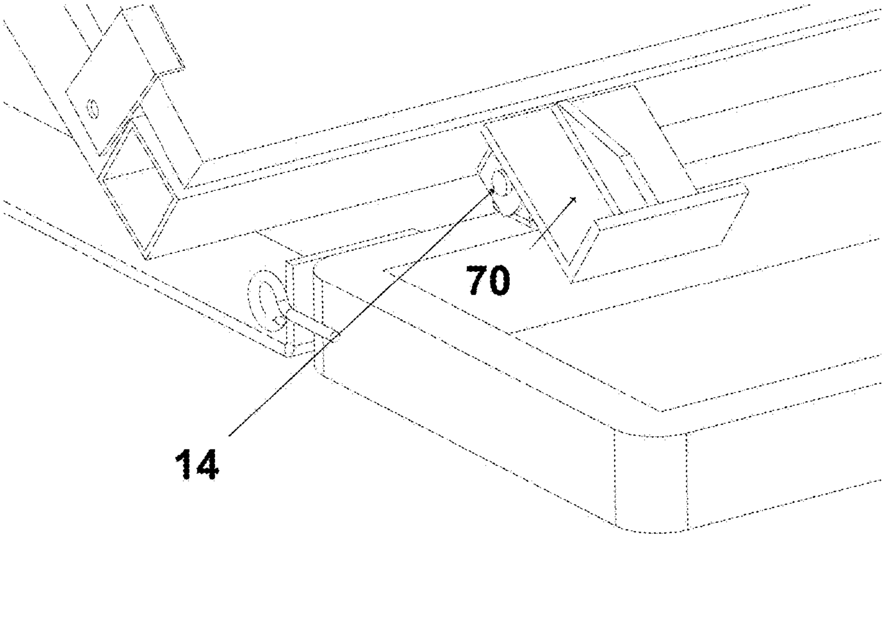
FIG.15B

ARTICULATING SOLAR PANEL MOUNT

BACKGROUND OF THE INVENTION

1. Field of the Invention

The present invention relates generally to solar arrays, and more specifically, to an articulating roof mount for solar arrays.

2. Description of Related Art

The solar industry is at the forefront of today's sustainability movement. Companies are spending a substantial amount of money outfitting their facilities with as many solar panels as possible, both to save cost and to reduce carbon footprint. The problem for many of these facilities is that roof functionality and accessibility takes precedence over the number of solar panels that can be used on a roof. Today, a large percentage of industrial roof space is set aside for maintenance accessibility needs, such as HVAC component access, fire protection/fighting needs, and common walkways. Currently, solar panels are not permitted in these areas.

The International Fire Code (IFC) imposes certain requirements on physical setbacks and space requirements which have significant impact on the potential placement of solar arrays. For example, the IFC mandates a six (6) foot setback around the entire perimeter of the roof, as well as a four (4) foot wide pathway around each roof hatch, and that space must be connected to the perimeter path of the roof by the addition of another four (4) foot wide pathway. These IFC-specified setbacks, along with maintenance access space, consume a large part of the roof real estate that could otherwise be filled with solar panels. An exemplary roof surface including an array of solar panels positioned surrounding a roof hatch in accordance with IFC setback mandates is shown in FIG. 1, in which the amount of usable—yet unutilized—roof space can clearly be seen.

Therefore, a need exists for a means to maximize usage of these code-mandated spaces, which go unused in the vast majority of instances, and in particular, a need exists for a means for utilization of the otherwise unused space for placement of solar arrays while still complying with IFC and other building code requirements.

SUMMARY OF THE INVENTION

Bearing in mind the problems and deficiencies of the prior art, it is therefore an object of the present invention to provide a means to maximize the number of solar panels which can be positioned on an existing roof structure while preserving maintenance accessibility needs.

It is another object of the present invention to provide a roof mount for a solar array which allows for utilization of otherwise unusable code-mandated roof spacing.

A further object of the invention is to provide an articulating roof mount for a solar array which permits walkway access to comply with existing building and fire code requirements for setbacks and spacing.

Still a further object of the invention is to provide an articulating roof mount for a solar array which permits access to the underside of the solar array for inspection, maintenance, and repair or replacement of components, without the need to remove the solar panel from the mounting assembly.

Still other objects and advantages of the invention will in part be obvious and will in part be apparent from the specification.

The above and other objects, which will be apparent to those skilled in the art, are achieved in the present invention which is directed, in one aspect, to an articulating solar panel mount assembly comprising a lower frame mountable to an installation surface and an upper frame for mechanically coupling to at least one solar panel and attached to the lower frame at a proximal end of the lower frame, wherein the upper frame is pivotable with respect to the lower frame between closed and open positions. In an embodiment, at least one hinge may be positioned on or proximate to a top surface of a cross-member of the lower frame to pivotally attach the upper frame to the lower frame. In at least one embodiment, a biasing mechanism such as a gas spring or strut is secured to the lower frame at a first end and to the upper frame at a second end, and is positioned to normally bias the distal end of the upper frame away from the lower frame toward the open position. A releasable latch mechanism is positioned to latch the upper frame to the lower frame in the closed position, wherein the latch mechanism includes a latch portion mounted for movement between a latch engaging position and a latch releasing position, and a trigger. Actuation of the trigger causes the latch portion to move from the latch engaging position to the latch releasing position to permit the upper frame to pivot to the open position as a result of a biasing force generated by the biasing mechanism.

In one or more embodiments, the latch mechanism may include a pin integral with or connected to the lower frame and offset from a top surface of the lower frame and extending in a direction approximately normal thereto, and the latch portion may be positioned proximate the distal end of an adjacent portion of the upper frame, wherein when the upper frame is in the closed position, the latch portion is releasably engaged with the pin.

The latch mechanism trigger may be a pull cord attached at one end to the latch portion for moving the latch portion from the latch engaging position to the latch releasing position when tension is applied to the pull cord. In one embodiment, the pull cord extends through a plurality of spaced mounting clips along the length of a portion of the upper frame. In another embodiment, the pull cord may be at least partially embedded within a channel extending along the length of at least a portion of the upper frame.

The articulating solar panel mount assembly may further comprise at least one mounting bracket for attaching a solar panel to the upper frame, the mounting bracket comprising prongs at or proximate one end thereof for coupling to an outer edge of the solar panel and at least one mounting hole proximate an opposite end for receiving a fastener therethrough to secure the mounting bracket to one of the legs of the upper frame.

In an embodiment, the articulating solar panel mount assembly may further comprise a stop member integral with or coupled to the at least one hinge to prevent over-rotation of the upper frame during articulation to the open position. The stop member may have a fin projecting outwardly therefrom and having an angled surface presenting in a generally upward direction.

The upper frame may have longitudinal sides and lateral sides shorter than the longitudinal sides, and in one embodiment, the upper frame is pivotally attached to the lower frame about one of the longitudinal sides. In another embodiment, the upper frame is pivotally attached to the lower frame about one of the lateral sides.

In another aspect, the present invention is directed to a method of mounting a solar panel to an installation surface. The method comprises providing a solar panel mount assembly comprising a lower frame secured to the installation surface and an upper frame attached to the lower frame at a proximal end of the lower frame, wherein the upper frame is pivotable with respect to the lower frame between closed and open positions; a biasing mechanism secured to the lower frame at a first end and secured to the upper frame at a second end, the biasing mechanism positioned to normally bias the distal end of the upper frame away from the lower frame toward the open position; a releasable latch mechanism positioned to latch the upper frame to the lower frame in the closed position, the latch mechanism including a latch portion mounted for movement between a latch engaging position and a latch releasing position, and a trigger; and at least one solar panel secured to the upper frame. The method further comprises actuating the trigger to cause the latch portion to move from the latch engaging position to the latch releasing position; and pivoting the upper frame and the at least one solar panel to the open position as a result of a biasing force generated by the biasing mechanism.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 15 is a front perspective view of the articulating solar panel mount of FIG. 5, in an open position. FIGS. 15A and 15B, respectively, show a stop mechanism according to an embodiment of the present invention moving from an open to a stopped position to prevent over-rotation of the upper frame member during articulation of the mount.

DESCRIPTION OF THE EMBODIMENT(S)

Figure 1:
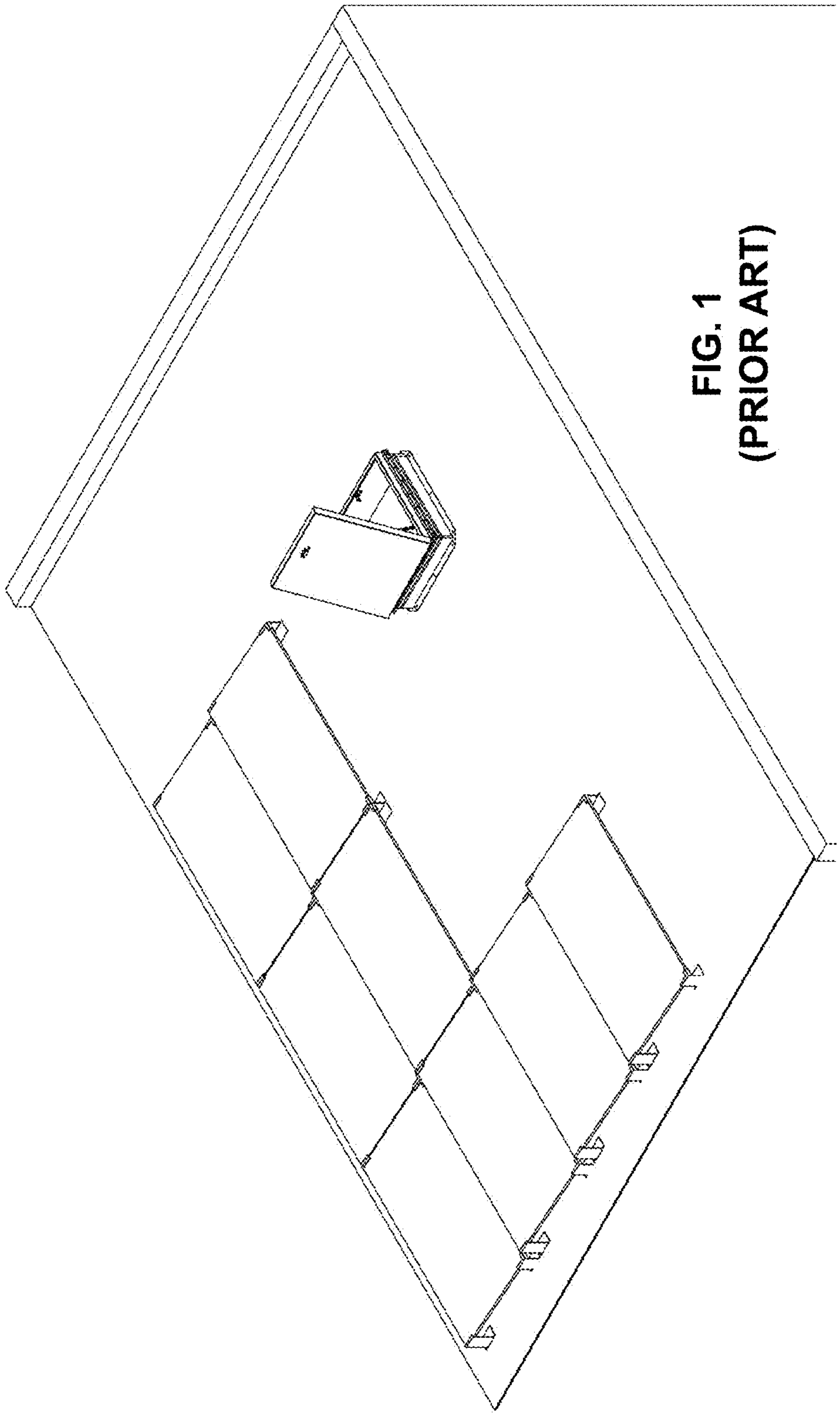
FIG. 1 (PRIOR ART)
FIG. 1 is a top perspective view of a portion of an exemplary roof surface including a roof hatch and an array of solar panels positioned in accordance with current IFC regulations.

In describing the embodiments of the present invention, reference will be made herein to FIGS. 1-18 of the drawings in which like numerals refer to like features of the invention.

Certain terminology is used herein for convenience only and is not to be taken as a limitation of the invention. For example, words such as “upper,” “lower,” “left,” “right,” “horizontal,” “vertical,” “upward,” “downward,” “clockwise,” “counterclockwise,” “longitudinal,” “lateral,” or “radial” merely describe the configuration shown in the drawings. Indeed, the referenced components may be oriented in any direction and the terminology, therefore, should be understood as encompassing such variations unless specified otherwise. For purposes of clarity, the same reference numbers may be used in the drawings to identify similar elements.

Additionally, in the subject description, the words “exemplary,” “illustrative,” or the like are used to mean serving as an example, instance, or illustration. Any aspect or design described herein as “exemplary” or “illustrative” is not necessarily intended to be construed as preferred or advantageous over other aspects or design. Rather, the use of the words “exemplary” or “illustrative” is merely intended to present concepts in a concrete fashion The solution to the aforementioned utilization problem is achieved by the articulating solar panel mount of the present invention, which allows dual usage of these code-mandated spaces which 99% of the time go unutilized.

Figure 2:
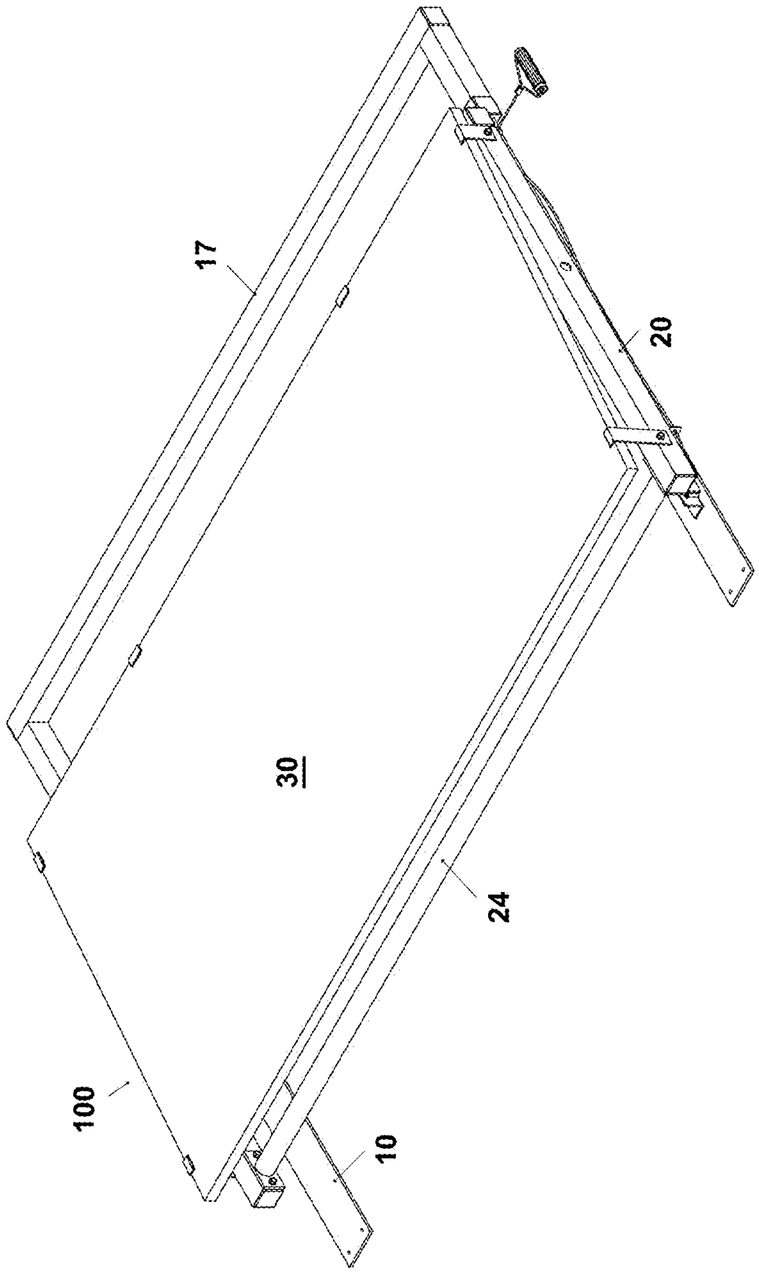
FIG. 2 is a top perspective view of an embodiment of an articulating solar panel mount according to the present invention, in the closed position.

Referring now to FIGS. 2-18, inclusive, embodiments of an articulating solar panel mount according to the present invention are shown. As shown in FIGS. 2-6, in one embodiment, the articulating solar panel mount 100 comprises a two-part frame: a slim profile lower frame 10 that rests on and is affixed to the roof surface, and a spring-actuated upper frame 20 that is pivotably attached to the lower frame on one side via one or more hinges 14. Lower frame 10 may comprise a generally “U”-shaped structure having a pair of substantially parallel legs 11*a*, 11*b* extending from a cross-member 16 disposed at a proximal end thereof. Preferably, legs 11*a*, 11*b* have at least the same length as the lateral sides of solar panel 30. Extension 17 extends from cross-member 16 in a direction opposite legs 11*a*, 11*b* to provide a counterweight when the upper frame 20 is in an open position with respect to lower frame 10, and may comprise a generally rectangular-shaped frame as shown in FIG. 2. In an embodiment, when in the fully open position, upper frame 20 is approximately perpendicular to lower frame 10.

Figure 5:
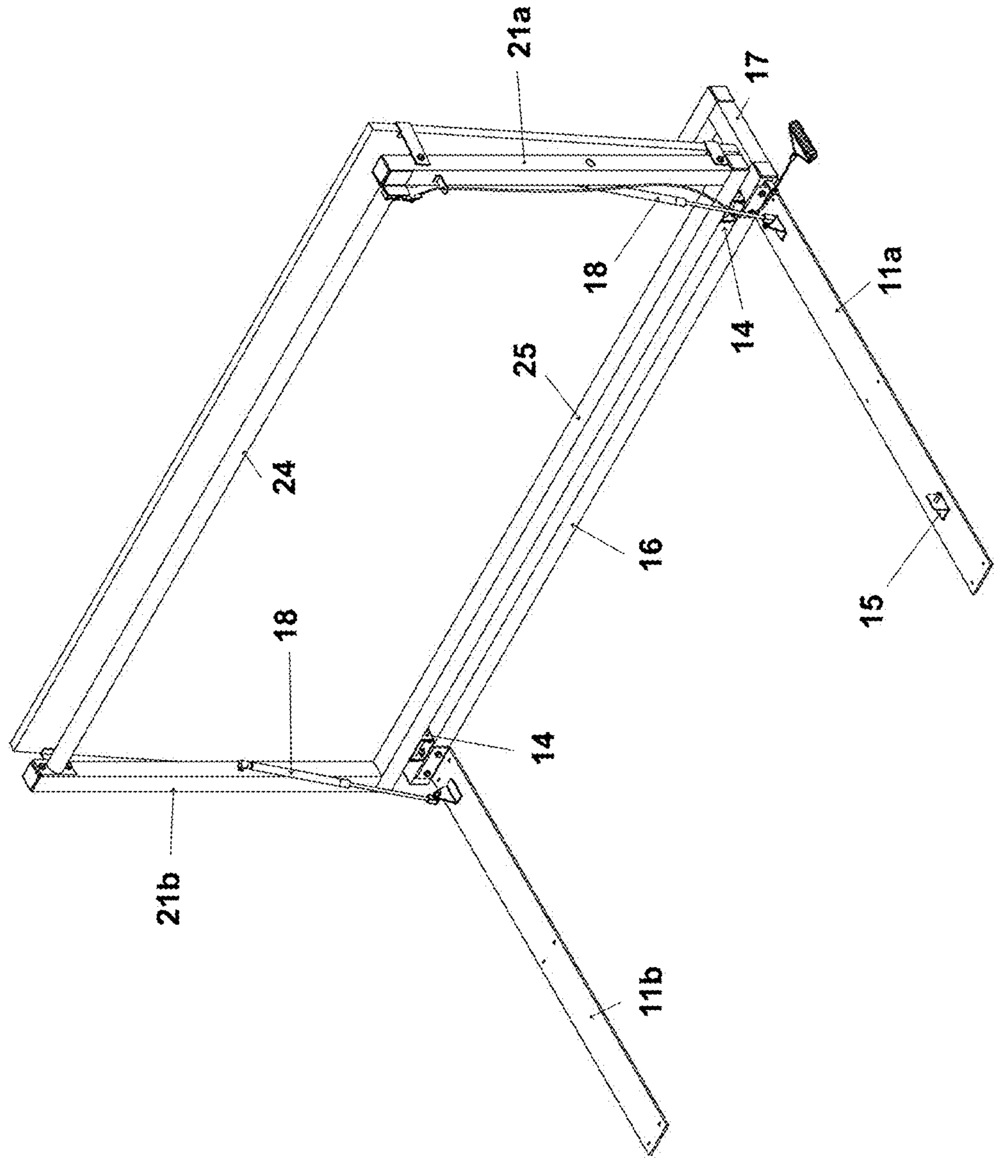
FIG. 5 is a perspective view of the articulating solar panel mount of FIG. 2, in the open position.
Figure 9:
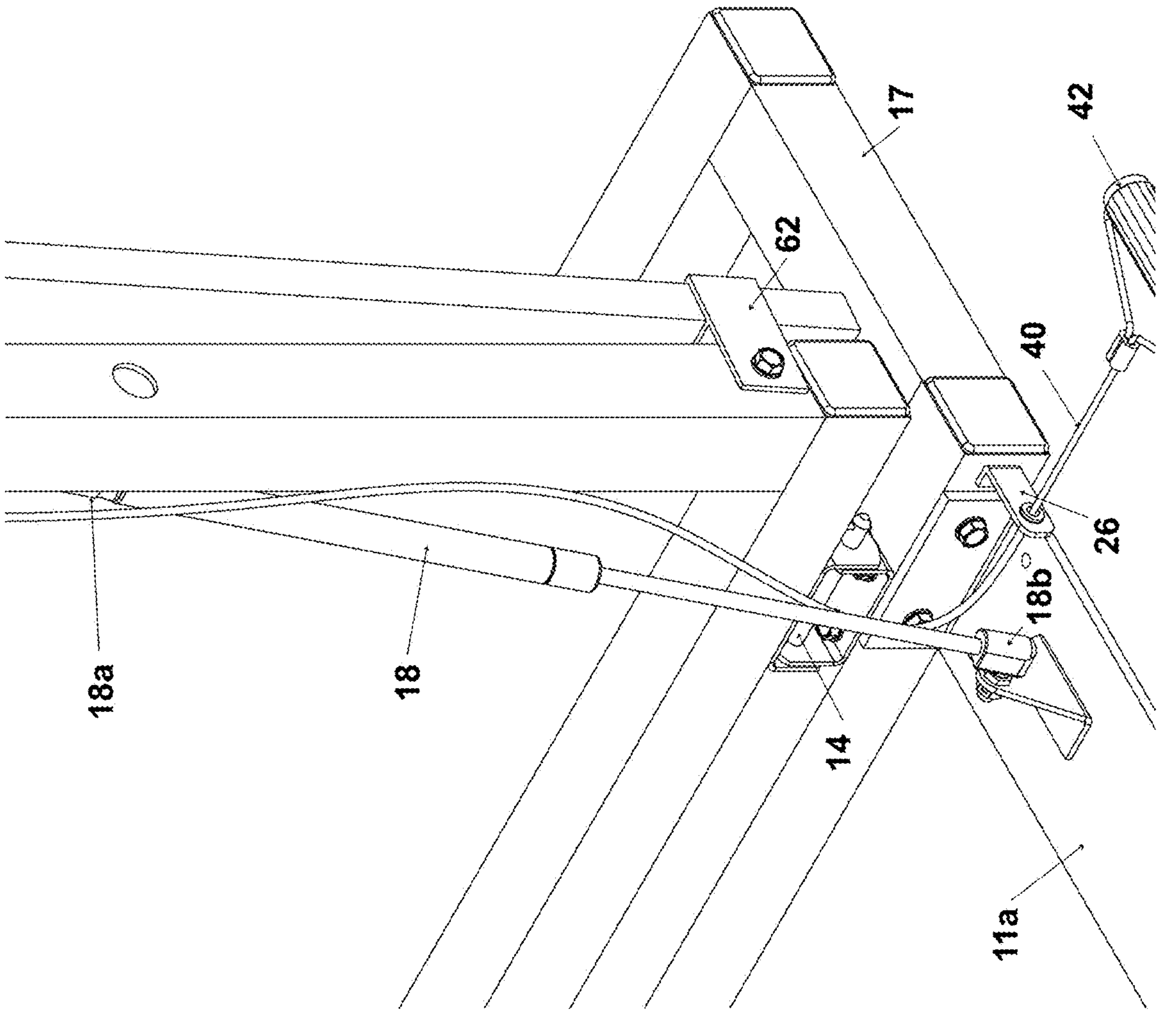
FIG. 9 is a perspective view of the hinged connection between the upper frame member and subframe member of the articulating solar panel mount of FIG. 5.

As shown in FIG. 5, in one embodiment, solar panel mount 100 comprises a pair of spaced hinges 14, each hinge proximate one of legs 11*a*, 11*b* along a top surface of cross-member 16 to pivotally attach upper frame 20 to lower frame 10. In an embodiment, as best seen in FIG. 9, a biasing mechanism 18, such as a gas spring or strut, is connected at a first end 18*a* to the upper frame 20 and at an opposite second end 18*b* to one of the legs 11*a* or 11*b* of lower frame 10, such that when a releasable latch mechanism 50 is moved from a latch engaging position to a latch release position, biasing mechanism 18 provides a push force to move the upper frame 20 and solar array 30 to an open position, as shown for example in FIGS. 5 and 6. In at least one embodiment, the solar mount of the present invention comprises a pair of gas springs 18, one attached to each of legs 11*a* and 11*b* at opposite sides of the mount, to provide symmetrical push forces to move the upper frame 20 to an open position, as shown for example in FIG. 5. It should be understood by those skilled in the art that the biasing mechanism is not limited to a gas spring and that other means to provide a push force may be utilized, including but not limited to mechanical springs such as compression springs, or hydraulic springs.

Figure 3:
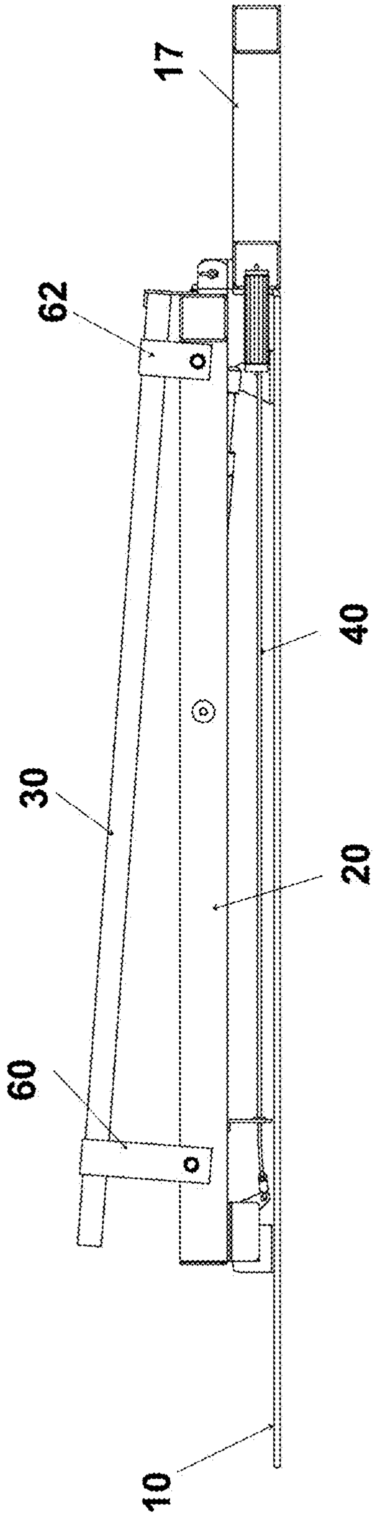
FIG. 3 is a right side plan view of the articulating solar panel mount of FIG. 2.
Figure 4:
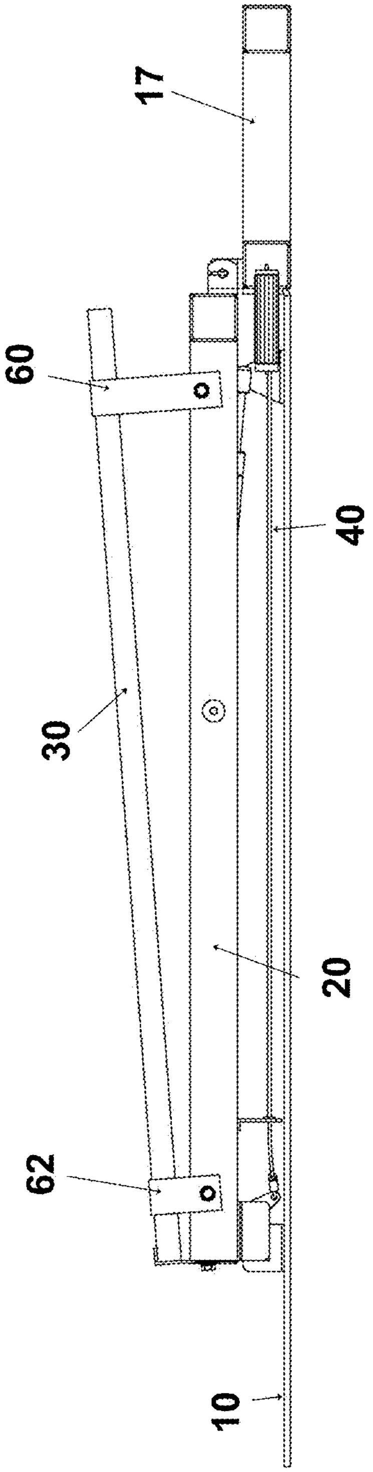
FIG. 4 is a left side plan view of the articulating solar panel mount of FIG. 2.
Figure 6:
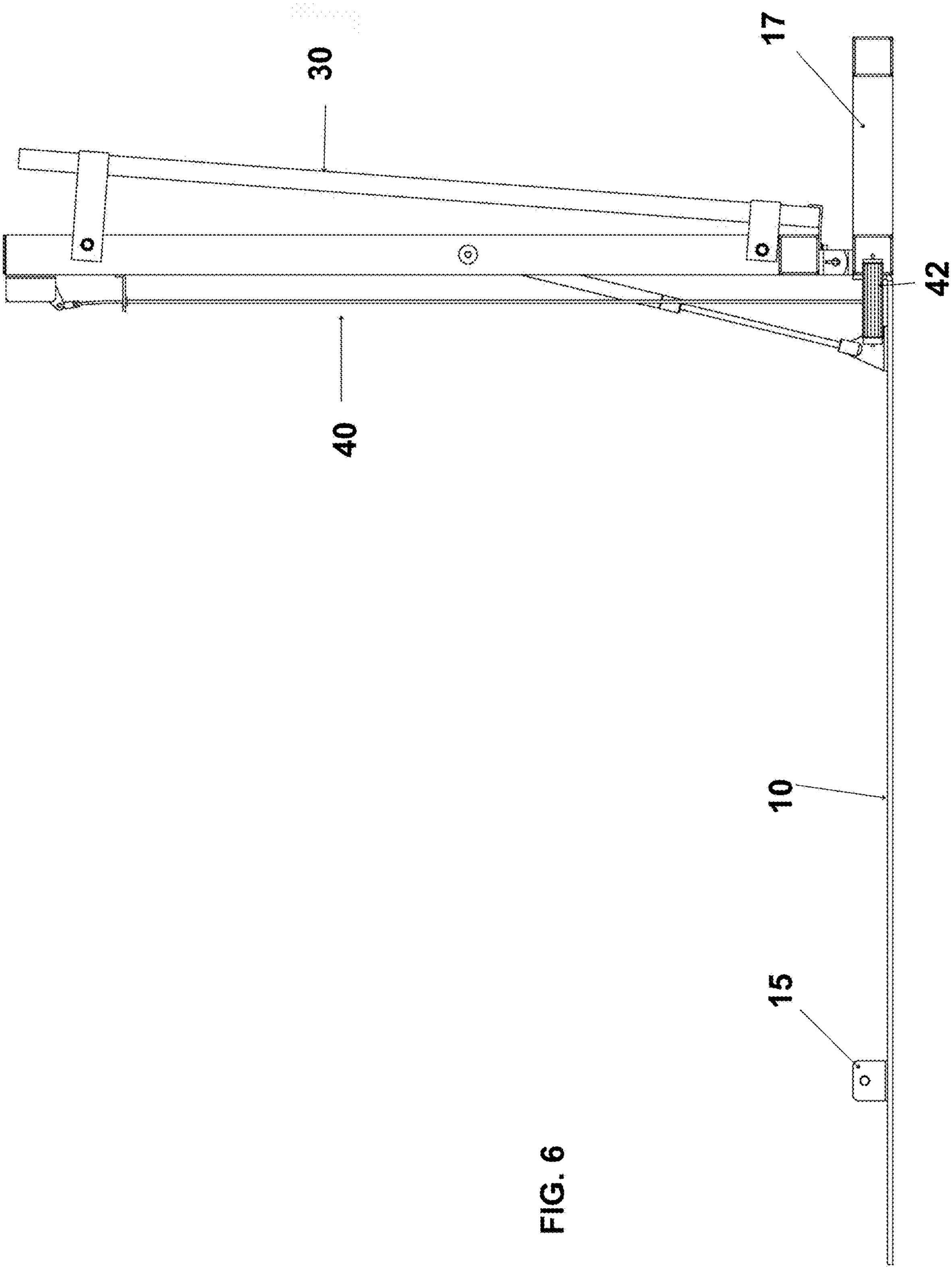
FIG. 6 is a right side plan view of the articulating solar panel mount of FIG. 5.

Upper frame 20 generally comprises a boundary having substantially the same dimensions as the solar panel or solar array to be attached thereto. In the embodiment shown, the upper frame comprises a pair of substantially parallel legs 21*a*, 21*b* extending from a cross-member 25 disposed at a proximal end thereof, and a transverse member 24 disposed between and securing legs 21*a*, 21*b* at or proximate to a distal end thereof. As shown in the Figures, rectangular solar panels are depicted and therefore upper frame 20 is also generally rectangular, having opposing longitudinal sides and lateral sides with approximately the same length as the longitudinal and lateral sides of the solar panel; however, it should be understood by those skilled in the art that the present invention is not limited to a rectangular configuration and may be adapted to fit solar panels having non-rectangular shapes. In at least one embodiment, upper frame 20 may be comprised of 2×2 AL tubing and may be hinged/folded to allow for compact shipping and assembly (FIGS. 2-4). One or more solar panels 30 may be attached to the topside of the upper frame 20. The hinged solar frame may be over sprung to self-open, accounting for the weight of the solar panel and the frame itself. As will be described in more detail below, release of latching mechanism 50 may be achieved via a trigger 40, such as a pull cord, allowing the upper frame member 20 to rotate upwardly about the hinged portion of the mount to an open position (FIGS. 5-6, 9).

Figure 7:
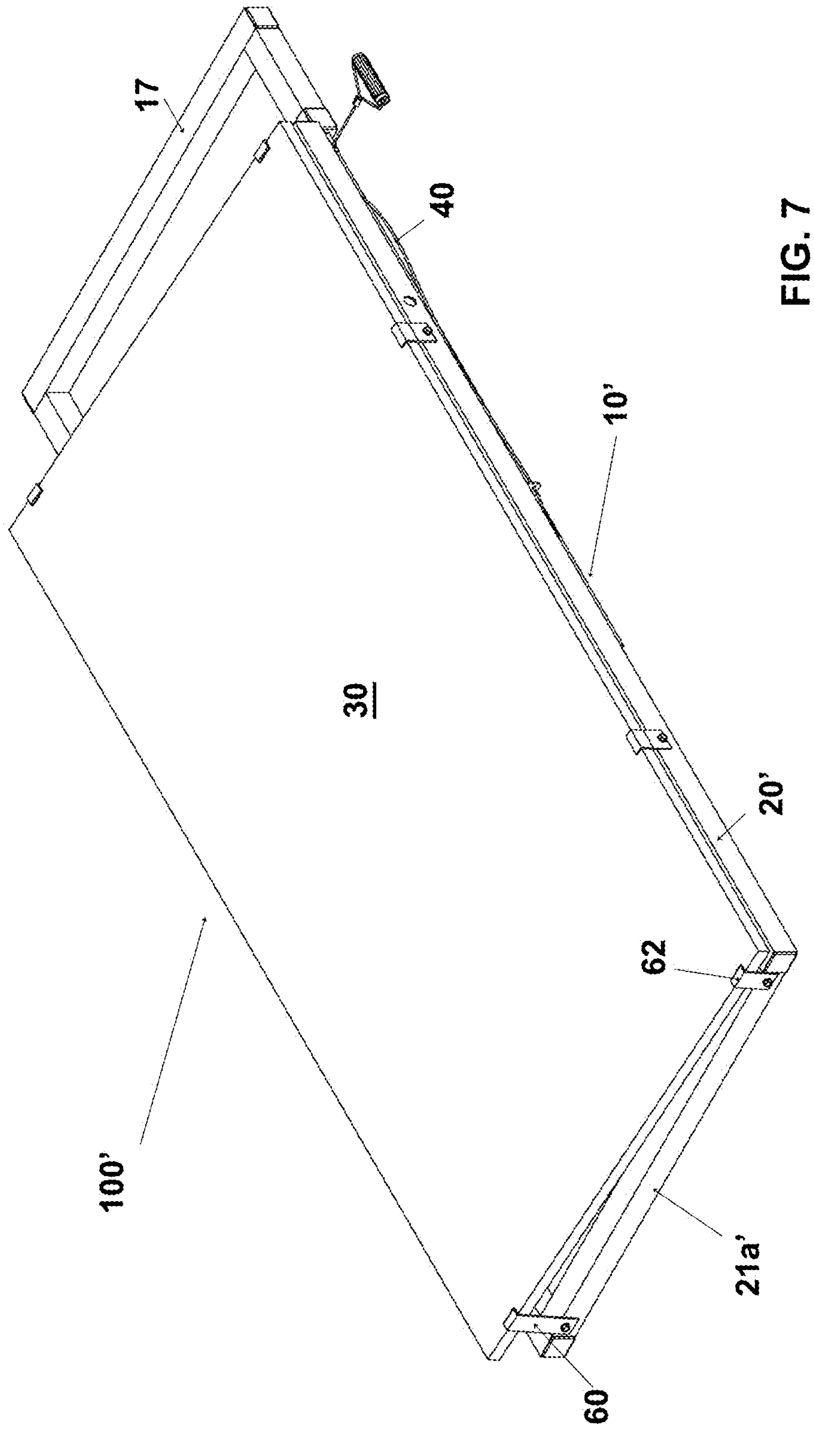
FIG. 7 is a top perspective view of another embodiment of an articulating solar panel mount according to the present invention, in the closed position.
Figure 8:
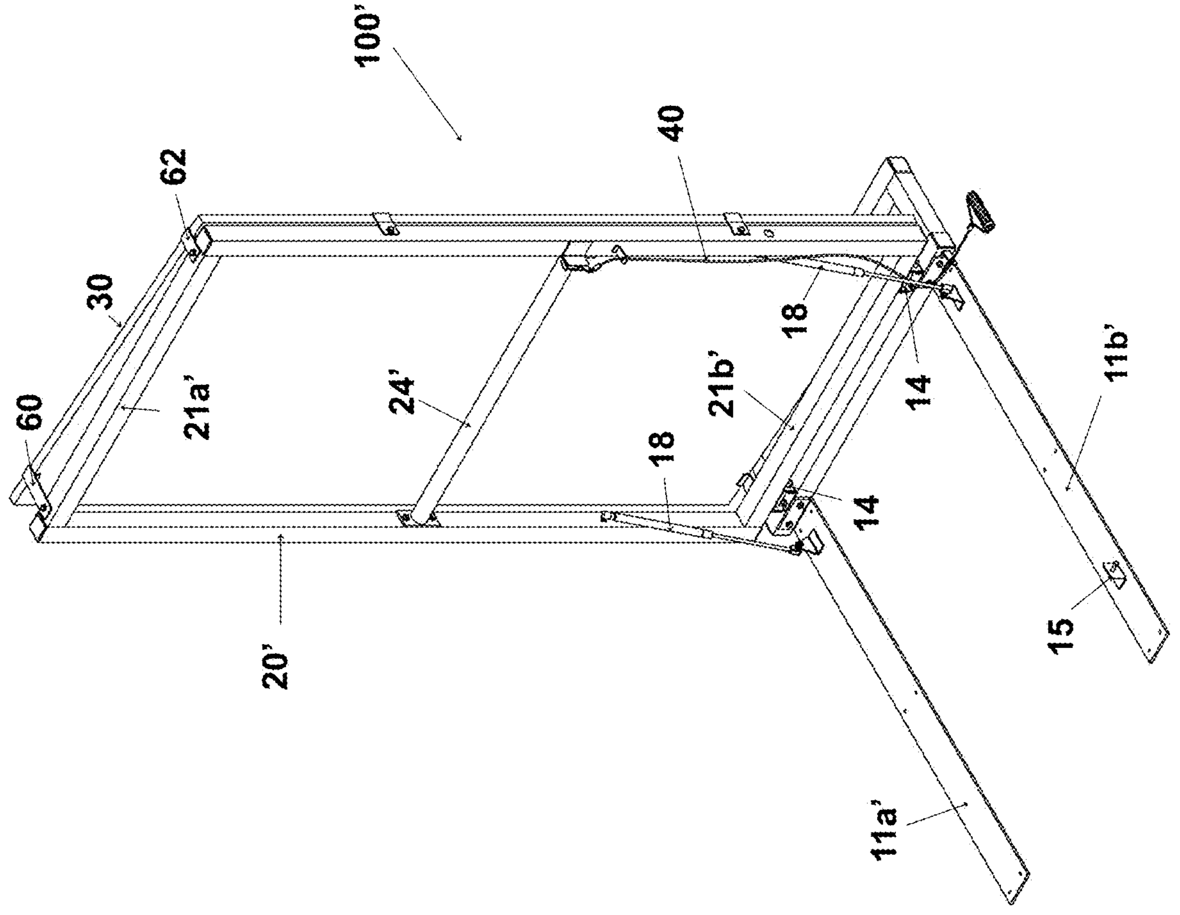
FIG. 8 is a perspective view of the articulating solar panel mount of FIG. 7, in the open position.
Figure 17:
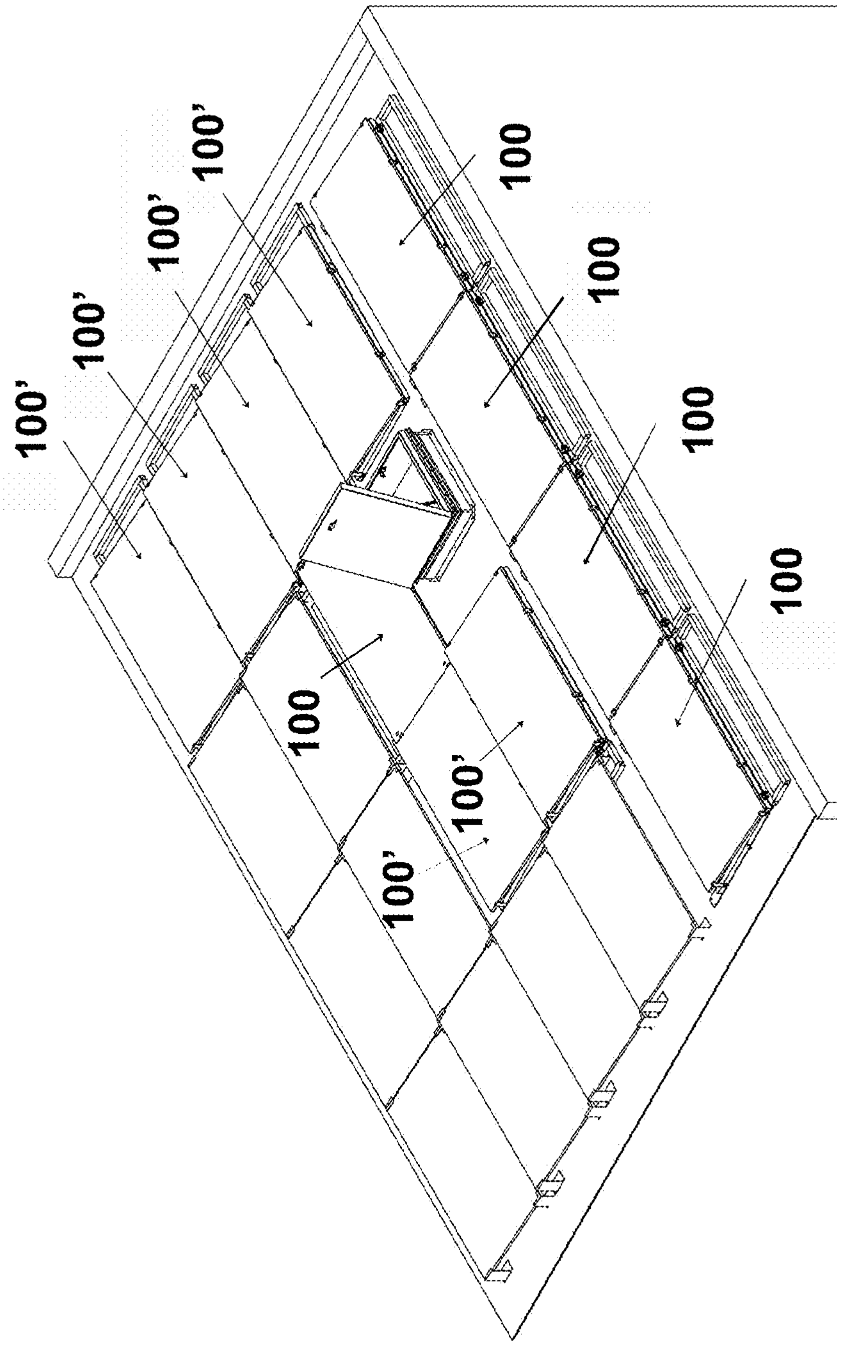
FIG. 17 shows an exemplary roof surface including an array of solar panels mounted to articulating solar panel mounts according to the present invention, with the mounts surrounding the roof hatch in the open position to comply with IFC regulations.
Figure 18:
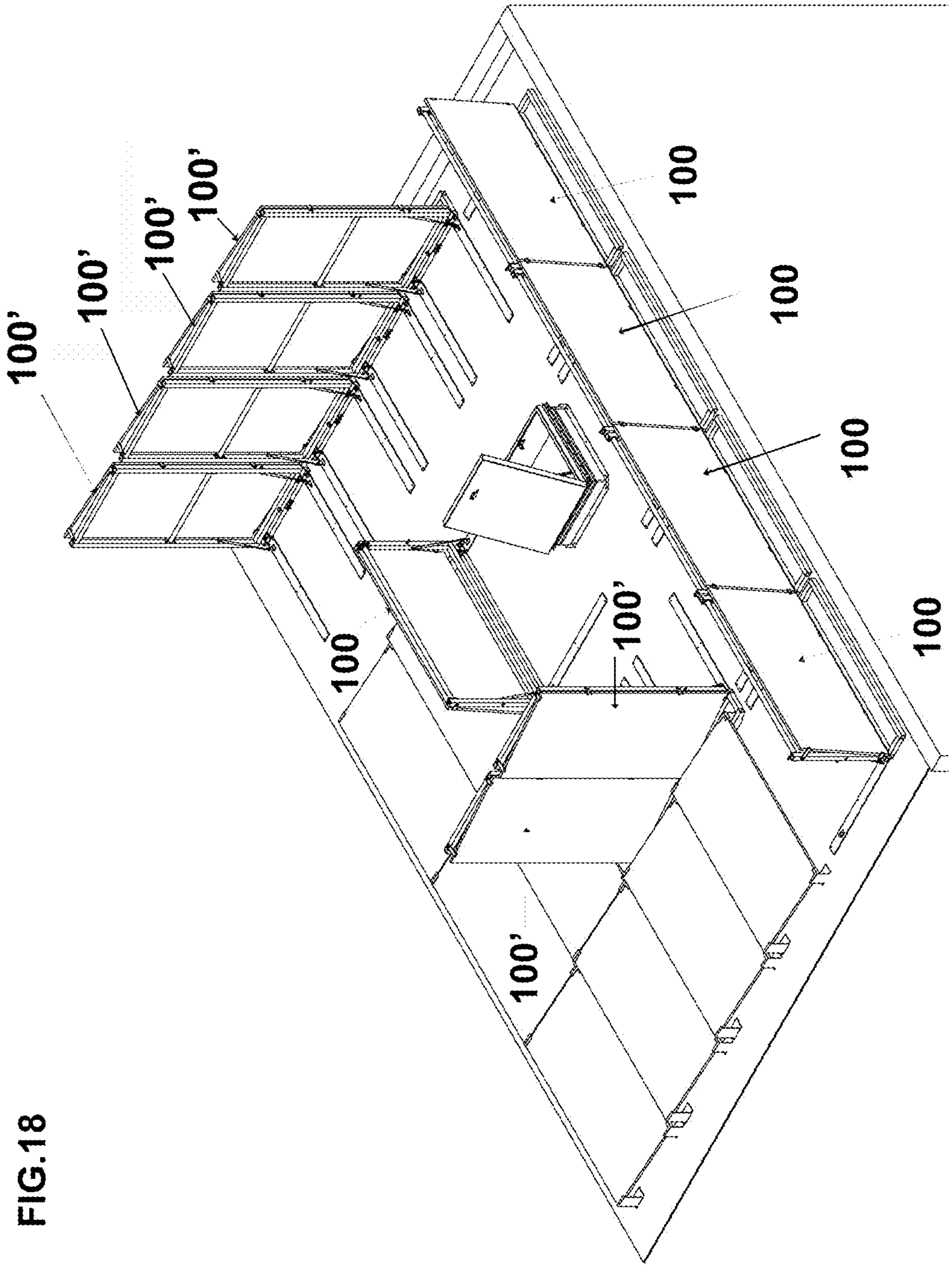
FIG. 18 shows the roof surface of FIG. 17, with the mounts surrounding the roof hatch in the closed position.

In the embodiment shown in FIGS. 2-6, upper frame 20 is hinged about the longitudinal or longer side of the solar panel; however it should be understood by those skilled in the art that in other embodiments, such as shown in FIGS. 7-8, hinge or hinges 14 may be positioned about the lateral or shorter side of the solar panel such that upper frame 20 instead pivots about the lateral side with respect to the lower frame 10, providing a narrower footprint in the pivoting direction. The adaptability of the present invention in this manner is advantageous, in that, it permits more efficient utilization of the available roof surface per design requirements. As shown for example in FIGS. 17-18, a plurality of articulating solar panel mounts according to the present invention are positioned in either longitudinally-hinged or laterally-hinged configurations to maximize utilization of the roof surface, while still complying with IFC setback mandates when the mounts adjacent to and surrounding the roof hatch are in the open position (FIG. 18).

Figure 10:
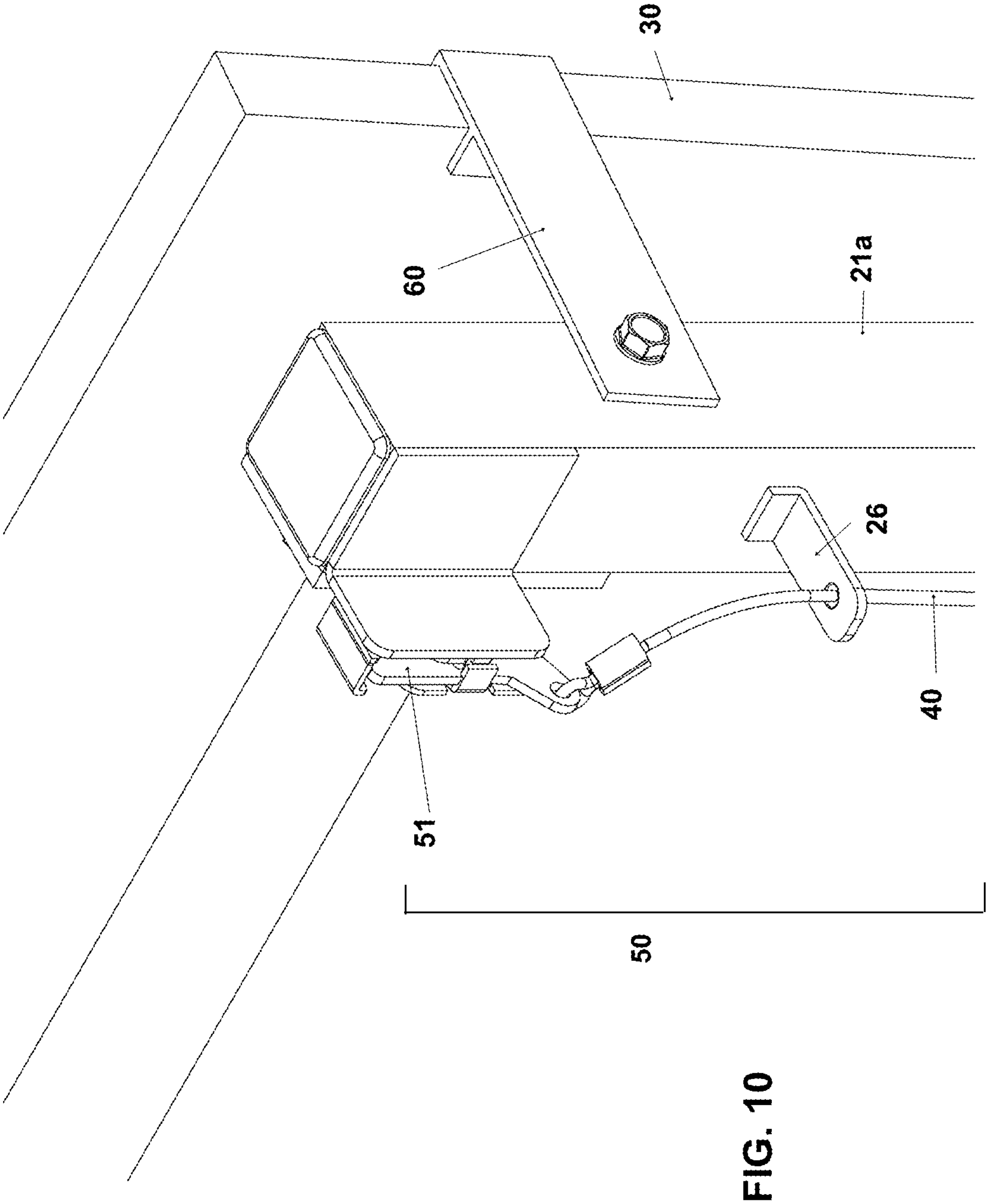
FIG. 10 is a perspective view of the distal end of the upper frame member of the articulating solar panel mount of FIG. 5, including a releasable latch mechanism.
Figure 11:
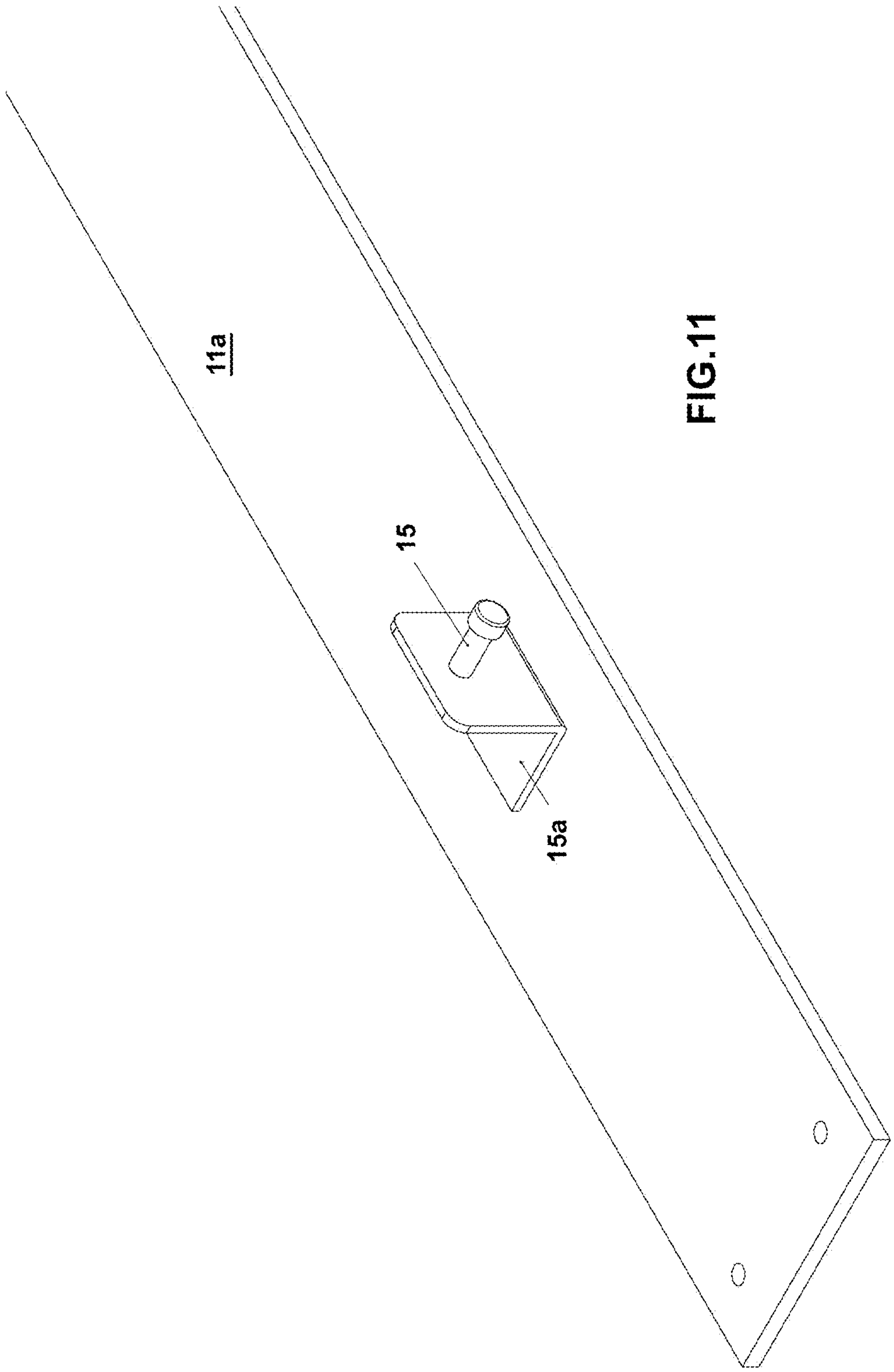
FIG. 11 is a perspective view of a portion of the subframe member of the articulating solar panel mount of FIG. 5, including a pin for attachment to the releasable latch mechanism.
Figure 12:
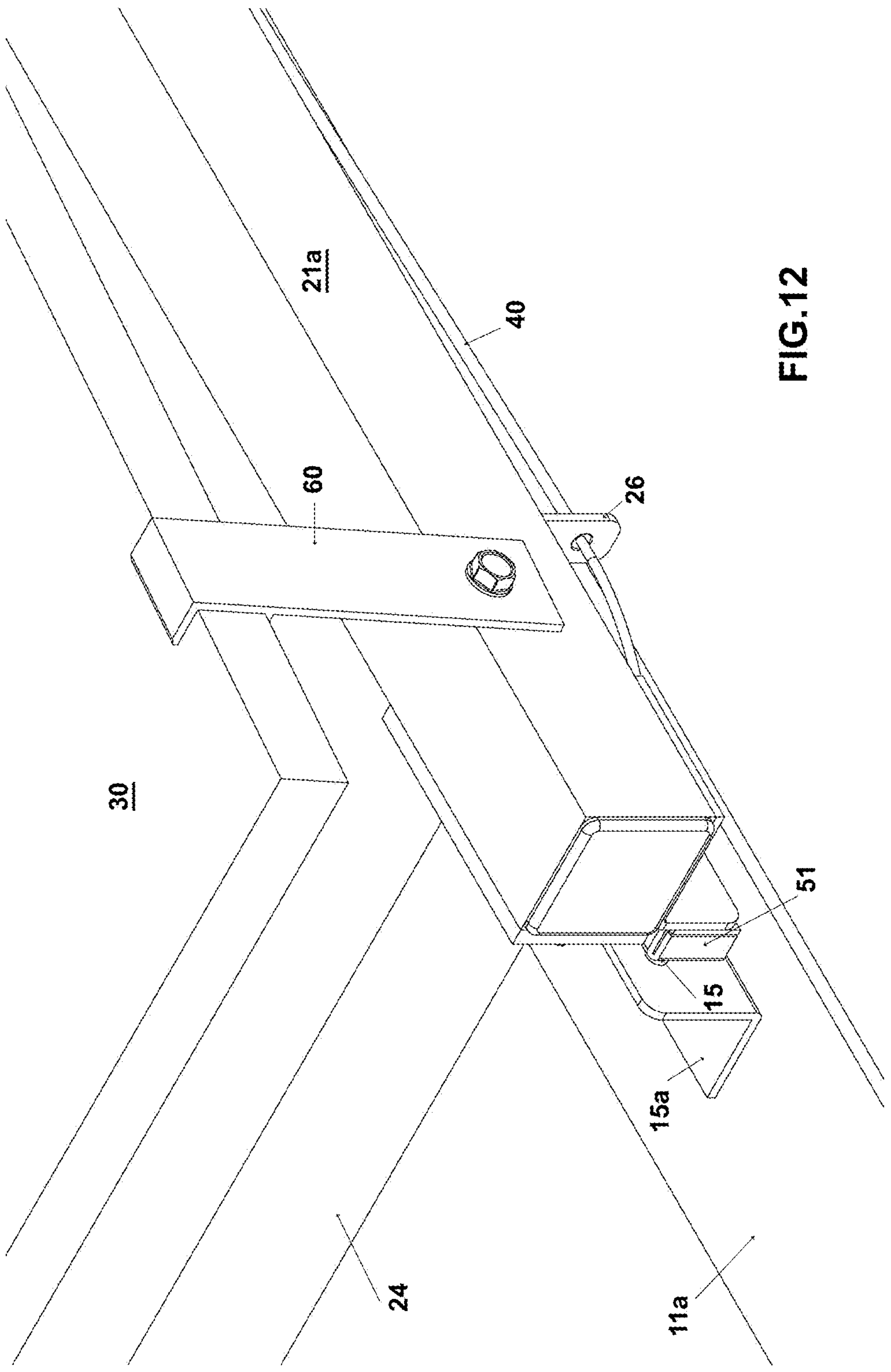
FIG. 12 is a perspective view of the distal end of the upper frame member of the articulating solar panel mount of FIG. 2.

Referring now to FIGS. 9 to 11, the components of one embodiment of the releasable latch mechanism 50 can best be seen. Latch mechanism 50 may be indexable and reversible, such that it can be adjusted to be accessed from either direction depending on installation needs. Latch mechanism 50 comprises, generally, a releasable latch portion 51 operably connected to a reversible quick release trigger, such as pull cord 40, that can be adjusted to be accessed from either direction depending on installation needs, and a pin 15 for mechanically coupling with latch 51. It should be understood by those skilled in the art that trigger 40 is not limited to a pull cord, and that other types of manually or automatically actuated trigger mechanisms may be used, such as a push button or switch, so long as the trigger affects movement of the latch 51 from a latch engaging position to a latch releasing position. As shown in FIGS. 10 and 11, in at least one embodiment, releasable latch 51 may be positioned proximate a distal end of upper frame leg 21*a*, and pin 15 may be positioned proximate a distal end of lower frame leg 11*a*, such that when the articulating solar panel mount of the present invention is in the closed position, latch 51 engages pin 15 to prevent articulation of the upper frame 20, as shown in FIG. 12.

In an embodiment, as shown in FIG. 11, pin 15 may be attached to or integral with bracket 15*a* secured to lower frame leg 11*a* or 11*b*, such that pin 15 is offset from the top surface of the leg of the lower frame and extends approximately normal thereto, to allow for coupling to releasable latch 51 when in the closed position. Pull cord 40 is coupled at one end to latch 51 and extends through a plurality of spaced mounting clips 26 along the length of one of the legs of upper frame 20, shown in FIGS. 9-10 as upper frame leg 21*a*, and may terminate at an opposite end in a handle 42. In one or more embodiments, cord 40 may be at least partially embedded within a channel extending along a length of the upper frame member leg so as to prevent entanglement during articulation of the solar panel and upper frame 20 with respect to the lower frame 10 when moving to an open position. When the articulating mount of the present invention is in the closed position, pulling the handle 42 will result in tensioning the pull cord 40 to release latch 51 from pin 15, thereby allowing biasing mechanism or gas spring 18 to provide the push force to move the upper frame and solar panel into the open position, as shown for example in FIGS. 5-6 and 8-9.

The latch release mechanism is designed to allow for “daisy chaining” multiple frames in succession (FIG. 16) and is indexable to work from either direction. This feature allows the almost instant creation of a walkway/path through the existing solar array (FIG. 17), such as by pulling a single release cable 40 to actuate the quick release. The latching mechanism is also designed to be tied into existing structures such as roof hatches and smoke vents, as well as fire alarm systems. It should be understood by those skilled in the art that the solar mounting options will encompass different types of existing solar installation systems, as well as allowing fine adjustment of the solar panel’s orientation on the frame.

Figure 13:
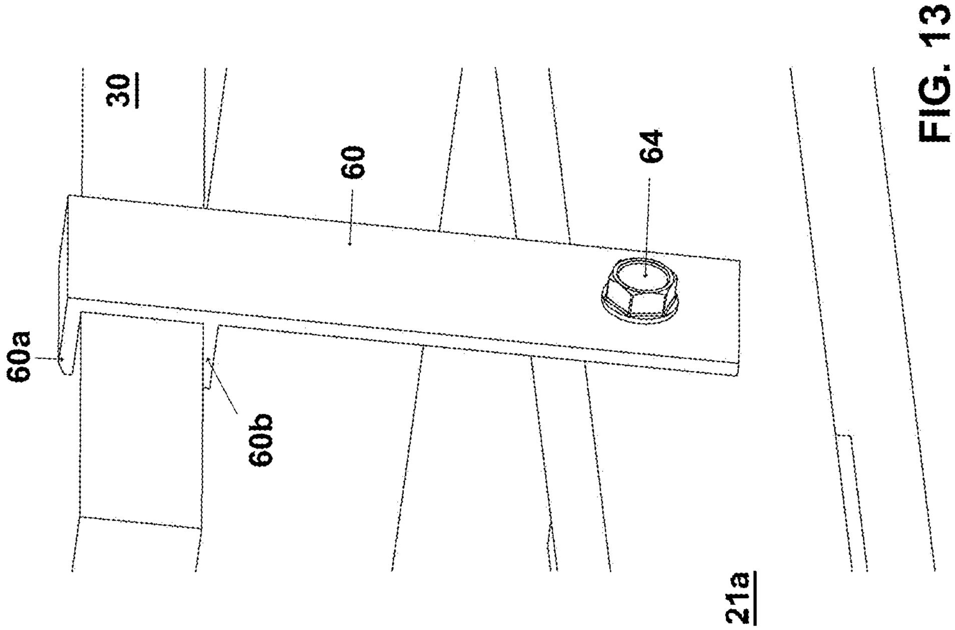
FIG. 13 is a perspective view of the distal end of an upper frame member of an articulating solar panel mount according to the present invention, including a mounting bracket for a solar panel.
Figure 14:
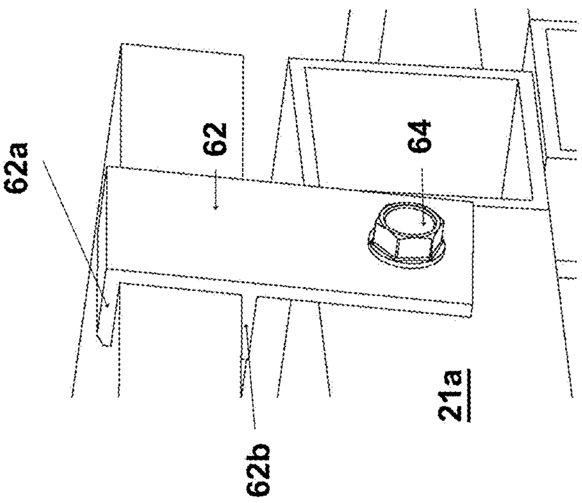
FIG. 14 is a perspective view of the proximal or hinged end of the upper frame member of FIG. 13, including a mounting bracket for a solar panel.
Figure 16:
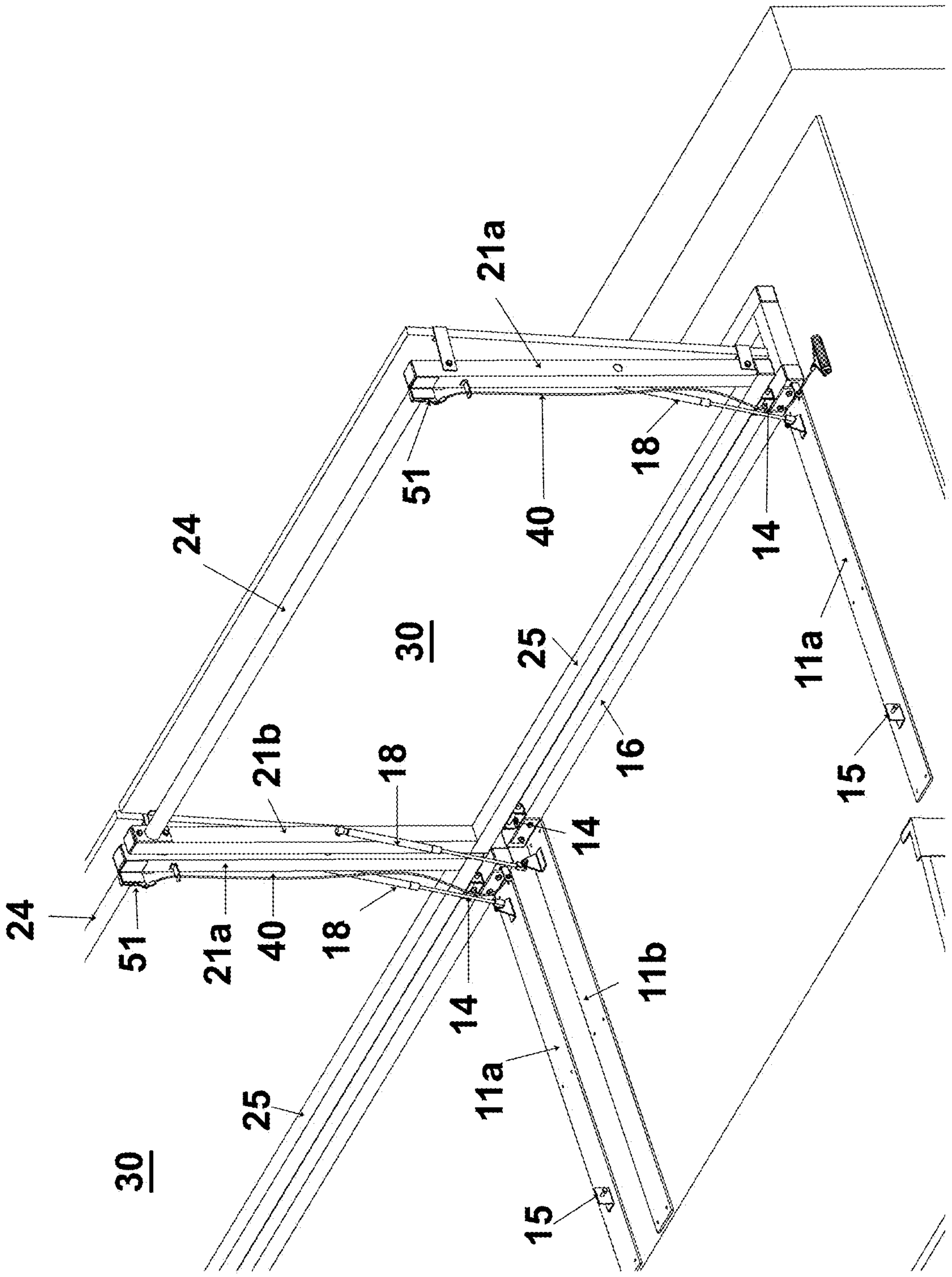
FIG. 16 is a perspective view of adjacent articulating solar panel mounts according to the present invention, in an open position and connected via daisy chain.

Referring now to FIGS. 13 and 14, a pair of bracket mounts 60, 62 on each side of upper frame 20 may be used to attach a solar panel to upper frame member 20. At one end of each bracket 60, 62 are forked prongs 60*a*, 60*b*, 62*a*, 62*b* for coupling to an outer edge of solar panel 30, and proximate an opposite end is at least one mounting hole for attaching to a leg of frame member 20 via a fastener 64. It should be understood by those skilled in the art that although only one mounting hole is shown for clarity, that additional holes at spaced locations along the length of one or both of mount 60, 62 may be used to allow for adjustment of the solar array to different angles. In one or more embodiments, panel mounts 60, 62 may be reversible so that the solar array 30 can tilt in the opposite direction as shown.

In one or more embodiments, the mount of the present invention may further include a stop member 70 attached to the topside of hinge 14 to prevent over-rotation of the upper frame member and solar array during articulation of the mount. As shown in FIGS. 15A-15B, stop member 70 may be generally L-shaped, with a fin 72 projecting outwardly therefrom and having an angled surface 74 presenting in a generally upward direction. When upper frame member 20 is pivoted about hinge 14 to an open position approximately perpendicular to lower frame member 10, the bottom edge of solar array 30 contacts the angled surface 74 of fin 72 to prevent over-rotation (FIG. 15B).

Typical commercial roof set back requirements for solar panel arrays reduce a roof's solar capacity in some cases up to 30%. It is anticipated that solar arrays utilizing the articulating mount of the present invention will be able to boast more efficiency and more savings without sacrificing any building functionality. Moreover, the ability to tie in to existing fire protection systems will ensure seamless functionality for all fire protection measures.

In at least one embodiment, the solar panel mount 100 or 100' of the present invention may be used as a safety railing at the edge of the roof line. Current solar arrays require a four (4) foot setback from the roof edge for walkway access. As shown in FIG. 17, the mount of the present invention permits such walkway access when in the open position, while further providing a safety railing. The safety railing option will present users with an OSHA 1910-compliant safety railing while in the open position, allowing operators to safely walk across the roof edge. Roofing consideration will be necessary for the safety railing configuration of the solar panel mount, as well as National Fire Protection Association (NFPA) consideration regarding fire fighter roof access in the case of emergency.

It should be understood by those skilled in the art that the articulating mount of the present invention is not limited to use only adjacent roof hatches and other code-mandated walkways, and that installation across a broader surface area, or even the entire surface area, of the roof has further advantages. For example, the articulating mount of the present invention allows for simplified inspection and maintenance of the solar arrays themselves. Most or all conventional solar panels or solar arrays include components referred to as optimizers that are installed and usually zip-tied to the underside of the panel. In order to inspect the optimizer on conventional solar panel mounts, the panel must be removed from the mounting assembly. By contrast, utilization of the articulating mount of the present invention would not require removal of the solar panel to inspect the optimizer or other components of the solar array. Instead, the releasable latch mechanism allows the mount and solar panel attached thereto to be pivoted to the open position, permitting access to the underside of the panel for inspection and simplified repair or replacement of certain components if necessary.

Thus, the present invention provides one or more of the following advantages: The articulating solar panel mount provides a means to maximize the number of solar panels which can be positioned on an existing roof structure while preserving maintenance accessibility needs. Moreover, the articulating solar panel mount of the present invention allows for utilization of otherwise unusable roof spacing, and permits walkway access to comply with existing building and fire code requirements for setbacks and spacing. Further, the articulating solar panel mount permits easy access to the underside of the solar panel when in the open position, allowing for simplified inspection, maintenance and repair or replacement of components of the panel.

While the present invention has been particularly described, in conjunction with one or more specific embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. An articulating solar panel mount assembly, comprising:

a lower frame mountable to an installation surface;

an upper frame for mechanically coupling to at least one solar panel, the upper frame attached to the lower frame at a proximal end of the lower frame and pivotable between closed and open positions via at least one hinge positioned on or proximate to a top surface of the lower frame;

a biasing mechanism secured to the lower frame at a first end and secured to the upper frame at a second end, the biasing mechanism positioned to normally bias the distal end of the upper frame away from the lower frame toward the open position;

a releasable latch mechanism positioned to latch the upper frame to the lower frame in the closed position, the latch mechanism including a latch portion mounted for movement between a latch engaging position and a latch releasing position, and a trigger, and a stop member integral with or coupled to the at least one hinge, the stop member comprising a fin projecting outwardly therefrom and having an angled surface presenting in a generally upward direction, wherein actuation of the trigger causes the latch portion to move from the latch engaging position to the latch releasing position to permit the upper frame to pivot to the open position as a result of a biasing force generated by the biasing mechanism.

2. The articulating solar panel mount assembly of claim 1, wherein the lower frame comprises at least a pair of substantially parallel legs extending from a cross-member disposed at or adjacent to a proximal end thereof, and the upper frame comprises at least a pair of substantially parallel legs extending from a cross-member disposed at a proximal end thereof and a transverse member disposed at or proximate to a distal end thereof and connecting the upper frame legs.

3. The articulating solar panel mount assembly of claim 2, further comprising a pin integral with or connected to one of the lower frame legs, the pin offset from a top surface of the lower frame leg and extending in a direction approximately normal thereto, and the latch portion is positioned proximate the distal end of an adjacent one of the upper frame legs, wherein when the upper frame is in the closed position, the latch portion is releasably engaged with the pin.

4. The articulating solar panel mount assembly of claim 1, wherein the latch mechanism trigger is a pull cord attached at one end to the latch portion for moving the latch portion from the latch engaging position to the latch releasing position when tension is applied to the pull cord.

5. The articulating solar panel mount assembly of claim 4, wherein the pull cord extends through a plurality of spaced mounting clips along the length of a portion of the upper frame.

6. The articulating solar panel mount assembly of claim 4, wherein the pull cord is at least partially embedded within a channel extending along the length of at least a portion of the upper frame.

7. The articulating solar panel mount assembly of claim 2, further comprising a substantially planar extension member extending from the lower frame cross-member in a direction opposite the lower frame legs to provide a counterweight when the upper frame is in an open position with respect to lower frame.

8. The articulating solar panel mount assembly of claim 1, wherein the upper frame is approximately perpendicular to the lower frame when in the open position.

9. The articulating solar panel mount assembly of claim 1, wherein the biasing mechanism is a gas spring or strut.

10. The articulating solar panel mount assembly of claim 1, further comprising at least one mounting bracket for attaching a solar panel to the upper frame, the mounting bracket comprising prongs at or proximate one end thereof for coupling to an outer edge of the solar panel and at least one mounting hole proximate an opposite end for receiving a fastener therethrough to secure the mounting bracket to the upper frame.

11. The articulating solar panel mount assembly of claim 1, wherein the stop member prevents over-rotation of the upper frame during articulation to the open position.

12. The articulating solar panel mount assembly of claim 1, wherein the upper frame has longitudinal sides and lateral sides shorter than the longitudinal sides, and wherein the upper frame is pivotally attached to the lower frame about one of the longitudinal sides.

13. The articulating solar panel mount assembly of claim 1, wherein the upper frame has longitudinal sides and lateral sides shorter than the longitudinal sides, and wherein the upper frame is pivotally attached to the lower frame about one of the lateral sides.

14. A method of mounting a solar panel to an installation surface, comprising:

providing a solar panel mount assembly comprising:

a lower frame secured to the installation surface and an upper frame attached to the lower frame at a proximal end of the lower frame and pivotable about the lower frame between closed and open positions via at least one hinge positioned on or proximate to a top surface of the lower frame;

a biasing mechanism secured to the lower frame at a first end and secured to the upper frame at a second end, the biasing mechanism positioned to normally bias the distal end of the upper frame away from the lower frame toward the open position;

a releasable latch mechanism positioned to latch the upper frame to the lower frame in the closed position, the latch mechanism including a latch portion mounted for movement between a latch engaging position and a latch releasing position, and a trigger;

a stop member integral with or coupled to the at least one hinge and comprising a fin projecting outwardly therefrom and having an angled surface presenting in a generally upward direction; and at least one solar panel secured to the upper frame;

actuating the trigger to cause the latch portion to move from the latch engaging position to the latch releasing position; and pivoting the upper frame and the at least one solar panel to the open position as a result of a biasing force generated by the biasing mechanism, wherein the stop member prevents over-rotation of the upper frame during articulation to the open position.

15. The method of claim 14 wherein the latch mechanism trigger is a pull cord attached at one end to the latch portion, and wherein the step of actuating the trigger further comprises:

applying tension to the pull cord to cause the latch portion to move from the latch engaging position to the latch releasing position.

16. The method of claim 14, further comprising:

contacting the stop member with a lower edge of the solar panel to prevent over-rotation of the upper frame during articulation to the open position.

17. The method of claim 14 wherein the upper frame has longitudinal sides and lateral sides shorter than the longitudinal sides, and wherein the upper frame is pivotally attached to the lower frame about one of the longitudinal sides.

18. The method of claim 14 wherein the upper frame has longitudinal sides and lateral sides shorter than the longitudinal sides, and wherein the upper frame is pivotally attached to the lower frame about one of the lateral sides.

* * * * *